United States Patent [19]

Berger et al.

[11] 3,989,879

[45] *Nov. 2, 1976

[54] PROCESS AND CATALYSTS FOR THE POLYMERIZATION AND COPOLYMERIZATION OF OLEFINS

[75] Inventors: Eugene Berger; Andre Delbouille, both of Brussels; Pol Gerard, Braine-l'Alleud; Jean-Louis Derroitte, Brussels, all of Belgium

[73] Assignee: Solvay & Cie, Belgium

[*] Notice: The portion of the term of this patent subsequent to Nov. 2, 1993, has been disclaimed.

[22] Filed: July 10, 1972

[21] Appl. No.: 270,007

Related U.S. Application Data

[63] Continuation-in-part of Ser. No. 118,998, Feb. 25, 1971, abandoned, which is a continuation of Ser. No. 676,738, Oct. 20, 1967, abandoned.

[30] Foreign Application Priority Data

July 21, 1971  France .......................... 71.26788

[52] U.S. Cl. .......................... 526/124; 252/429 R; 252/429 C; 252/431 R; 252/431 C; 252/431 N; 526/114; 526/115; 526/121; 526/352
[51] Int. Cl.² .......................... C08F 4/02; C08F 10/02
[58] Field of Search .......... 260/88.2, 93.7, 94.9 DA; 252/429 C, 429 R, 431 R, 431 N, 431 C; 526/124

[56] References Cited

UNITED STATES PATENTS 3,642,760   2/1972   Baekelmans et al. ....... 260/94.9 DA

FOREIGN PATENTS OR APPLICATIONS

| | | |
|---|---|---|
| 2,010,521 | 2/1970 | France |
| 7,000,094 | 7/1970 | Netherlands |
| 7,113,010 | 4/1972 | Netherlands |
| 884,249 | 12/1961 | United Kingdom |
| 837,251 | 6/1960 | United Kingdom |
| 1,140,649 | 1/1969 | United Kingdom |
| 1,212,320 | 11/1970 | United Kingdom |

*Primary Examiner*—Edward J. Smith
*Attorney, Agent, or Firm*—Pennie & Edmonds

[57] ABSTRACT

The present invention relates to catalytic complexes for the polymerization and copolymerization of olefins comprising the reaction product of a halogenated derivative of a transition metal with a chelate organic oxygenated bivalent metal compound substantially free of hydroxyl groups; to the catalyst compositions formed by activating such complexes with an organometallic compound; and to the processes of forming such catalytic complexes and polymerizing and copolymerizing olefins utilizing such catalyst compositions.

28 Claims, No Drawings

PROCESS AND CATALYSTS FOR THE POLYMERIZATION AND COPOLYMERIZATION OF OLEFINS

CROSS REFERENCE TO RELATED APPLICATIONS

The instant application is a continuation-in-part of our application Ser. No. 118,988, filed Feb. 25, 1971, now abandoned, which, in turn, is a continuation of our application Ser. No. 676,738, filed Oct. 20, 1967 now abandoned.

BACKGROUND OF THE INVENTION

In our copending application Ser. No. 118,998, there are described a process and catalysts for the polymerization and copolymerization of olefins in which the operation is carried out in the presence of a catalyst obtained, by activation with an organometallic compound, of the product of the reaction between a halogenated derivative of a transition metal and a solid support constituted by an oxygenated compound of a bivalent metal substantially free of hydroxyl groups.

In the course of the reaction between the halogenated derivative and the solid support, complexes containing halogen, bivalent metal, and transition metal are formed. It is found that superficial halogenation of the solid support occurs. Nevertheless, this halogenation is generally slight, the total amount of halogen present frequently being less than 0.05 halogen atom per atom of bivalent metal.

Applicants have now found that when particular solid supports are selected, the halogenation is much greater and that complexes of bivalent metal, transition metal, and halogen are obtained which are far more productive.

SUMMARY OF THE INVENTION

The present invention relates to catalytic complexes for the polymerization and copolymerization of olefins comprising the reaction product of a halogen-containing transition metal compound and a chelate organic oxygenated bivalent metal compound substantially free of hydroxyl groups; to catalyst compositions comprising said catalytic complexes and an organometallic compound; and to the processes of forming such catalytic complexes and polymerizing and copolymerizing olefins utilizing such catalyst compositions.

DETAILED DESCRIPTION

In the present application, the term "chelate organic oxygenated bivalent metal compounds" is intended to mean all compounds and complexes in which the bivalent metal atom has at least one sequence of normal bonds of the bivalent metal-oxygen-carbon type and at least one coordination bond, in such a manner as to form a heterocycle in which the bivalent metal atom is included. This definition is the one usually accepted for chelate metal complexes (see Ullmanns Encyclopadie der technischen Chemie, volume 10, 1958, Munich-Berlin, p. 628 and 629 or The Condensed Chemical Dictionary, 1965, New York, p. 248 and 249). Although all chelate organic compounds of bivalent metals are suitable, it is preferred to use those of magnesium, calcium, zinc, manganese, nickel, iron, cobalt, and tin. The best results are obtained with magnesium compounds.

The chelate organic oxygenated compound may also be of any nature. Nevertheless, it is preferred to use compounds in which the carbon radicals linked to the bivalent metal in order to form the heterocycle contain from 1 to 20 carbon atoms, preferably from 1 to 10 carbon atoms. In addition to the oxygen atom making the normal bond with the bivalent metal atom, these radicals contain at least one atom or group having a pair of free electrons capable of making the coordination bond, such as nitrogen and oxygen atoms and particularly the groups

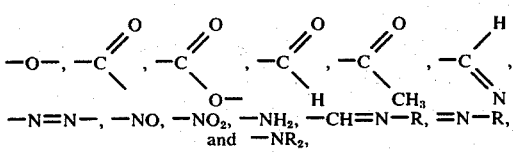

in which R is a hydrogen atom or an alkyl, aryl, cycloalkyl, alkylaryl, or arylalkyl radical.

In the compounds used the substitution position of the atom containing the pair of free electrons forming the coordination bond on the organic radical is such that the heterocycle formed contains from 5 to 7, and preferably 6 atoms in all.

The carbon radicals linked to the bivalent metal by means of oxygen and of the coordination bond may be saturated or unsaturated, of the branched chain, straight chain, or cyclical type; they may also be substituted. They are in particular selected from the alkyl, alkenyl, aryl, cycloalkyl, arylalkyl, alkylaryl, acyl, aroyl radicals and their substituted derivatives.

Among the chelate organic oxygenated compounds of bivalent metals which are suitable for the process of the invention, it is preferred to use the enolates, such as the acetylacetonates and complexes obtained from phenol derivatives having an electrodonor group in the ortho position in relation to the hydroxyl group, such as those of 8-hydroxy-quinolein (see Houben-Weyl, Methoden de organischen Chemie, Sauerstoff-Verbindungen, VI, Part 2, 1963, p. 41 to 58).

Also suitable for carrying out the invention are chelate organic oxygenated compounds containing two heterocyclic cycles as specified above, or those which contain only one unit of this kind fixed to the bivalent metal, but containing in addition other radicals linked to the bivalent metal. Among these other radicals mention may be made of halide radicals, radicals derived from inorganic acids, such as sulphate, nitrate, phosphate, or carbonate radicals, radicals derived from carboxylic organic acids, such as butanoate, benzoate, or adipate radicals, radicals derived from alcohols such as methanolate, ethanolate, and cyclohexanolate radicals, and radicals derived from phenates such as cresolate radicals.

Specific examples of suitable bivalent metal compounds in addition to the magnesium acetylacetonate and magnesium 8-hydroxyquinoleinate are:

acetylacetonates of calcium, zinc, manganese, nickel, iron, cobalt or tin 8-hydroxyquinoleinates of calcium, zinc, manganese, nickel, iron, cobalt or tin nitriloacetates of magnesium, calcium, zinc, manganese, nickel, iron, cobalt or tin ethylenediaminetetraacetates of magnesium, calcium, zinc, manganese, nickel, iron, cobalt or tin aminoacetates of magnesium, calcium, zinc, manganese, nickel, iron, cobalt or tin.

The chelate organic oxygenated compounds suitable for carrying out the invention must be substantially free from hydroxyl groups fixed on the bivalent metal. They must preferably contain less than 0.1 hydroxyl group per atom of bivalent metal. Nevertheless, hydroxyl groups which are bound to the carbon radical and which have not fixed any bivalent metal are not troublesome and are not taken into account in determining whether the chelate organic oxygenated compound is free from hydroxyl groups.

The granulometry of the solid support is not critical. For reasons of convenience, it is nevertheless preferred to use particles the mean diameter of which is between 1 and 500 microns, and preferably between 40 and 200 microns.

The catalysts of the invention comprise catalytic complexes obtained by reacting the solid support with a halogenated derivative of a transition metal. As used herein, the term "transition metal" includes metals of groups IVB, VB, and VIB of the Periodic Table. The halogenated derivative used may be a halide, oxyhalide, or an alkoxyhalide. It is preferred to use brominated and chlorinated derivatives of titanium, zirconium, vanadium, and chromium, such as $TiCl_4$, $TiBr_4$, $VCl_4$, $VOCl_3$, $VOBr_3$, $CrO_2Cl_2$, $Ti(OC_2H_5)_3Cl$, $Ti(OiC_3H_7)_2Cl_2$, and $Ti(OiC_3H_7)Cl_3$. The best results are obtained with $TiCl_4$. When use is made of the derivatives containing alkoxide radicals, they are preferably selected from those the linear or branched alkoxide radicals of which contain from 1 to 20 carbon atoms, and more particularly from 1 to 10 carbon atoms.

The reaction of the solid support with the halogenated derivative may be effected by any method. The halogenated derivative may be used in vapor form or in the form of a gas, optionally diluted with an inert gas, in liquid form, or in solution form. The solvent used will generally be the diluents habitually used in the low pressure polymerization of oelfins. When operating in solution, it is preferred to use high concentrations of halogenated derivative (preferably more than 50% by weight). A particularly convenient procedure consists in bringing the solid support into contact with the pure halogenated derivative, which is kept in the liquid state. The solid support may for example be suspended in the halogenated derivative, or else the solid support may be washed by means of the halogenated derivative.

The temperature and pressure at which this reaction is carried out are not critical. As a rule, for reasons of convenience, the operation is carried out at atmospheric pressure and at a temperature between 0° and 300° C, preferably between 20° and 150° C. The reaction is carried out for a time sufficient to enable the catalytic complex to be formed. As a rule, this complex is formed at the end of 1 hour. After the reaction, the catalytic complex, which is likewise solid, is collected separately. It may be extracted with the aid of the same halogenated derivative as was used for the reaction, this derivative being kept in the liquid state. The complex is then generally washed by means of an inert hydrocarbon solvent in order to eliminate excess reagents.

Elementary analysis of the catalytic complexes obtained in this manner shows that these are definitely chemically bonded complexes produced by chemical reactions, and not resulting from mixtures or adsorption phenomena. It is in fact impossible to separate the transition metal derivative from these complexes by using purely physical separation methods.

These complexes comprise the bivalent metal, the transition metal, and the halogen. The amount of halogen metal is high. Analysis shows in fact that the halogen/transition metal atomic ratio is higher than its value in the starting halogenated derivative. Thus, when the starting material is $TiCl_4$, the Cl/Ti atomic ratio is higher than 4. Furthermore, the halogen/bivalent metal atomic ratio is likewise high. As a rule, it is higher than 0.5, and most often higher than 1. While the precise theory is not completely understood, it is believed that the high halogen content of the catalytic complexes of the invention are the result of the reaction of the gaseous by-products of the reaction between the halogenated derivative and the solid support (principally hydrogen halide). It is therefore indispensable that the reaction be carried out so as not to eliminate these gaseous by-products from the reaction zone, for, if eliminated, the extremely active catalytic complexes of the invention will not be obtained. Thus, the reaction vessel used should be one which can be closed to prevent escape for gaseous materials.

The catalysts according to the present invention likewise contain an organometallic compound which serves as activator. Use is made of organic compounds of metals of groups Ia, IIA, IIB, IIIA, and IVA of the Periodic Table, such as the organic compounds of lithium, magnesium, zinc, aluminium, or tin. The best results are obtained with the organic compounds of aluminium.

It is possible to use completely alkylated compounds whose alkyl chains contain from 1 to 20 carbon atoms and are straight or branched, such as for example n-butyllithium, diethylmagnesium, diethylzinc, trimethylaluminium, triethylaluminium, triisobutylaluminium, tri-n-butylaluminium, tri-n-decylaluminium, tetraethyltin, and tetrabutyltin.

It is also possible to use alkyl metal hydrides in which the alkyl radicals likewise contain from 1 to 20 atoms of carbon, such as diisobutylaluminium hydride and trimethyl tin hydride. Also suitable are alkylhalides of metals in which the alkyl radicals also contain from 1 to 20 carbon atoms, such as ethylaluminium sesquichloride, diethylaluminium chloride and diisobutylaluminium chloride.

Finally, it is also possible to use organo-aluminium compounds obtained by reacting trialkylaluminiums or dialkylaluminium hydrides in which the radicals contain from 1 to 20 carbon atoms with diolefins containing from 4 to 20 carbon atoms, more particularly the compounds known as isoprenylaluminium.

The process of the invention is applicable to the polymerization of terminally unsaturated olefins the molecule of which contains from 2 to 20, and preferably 2 to 6, carbon atoms, such as ethylene, propylene, butene-1, 4-methylpentene-1 and hexene-1. It is also applicable to the copolymerization of these olefins with one another and also with diolefins containing preferably 4 to 20 carbon atoms. These diolefins may be nonconjugated aliphatic diolefins, such as hexadiene-1,4, nonconjugated monocyclic diolefins such as 4-vinylcyclohexene, 1,3-divinylcyclohexane, cyclopentadiene-1,4, or cyclooctadiene1,3, alicyclic diolefins having an endocyclic bridge, such as dicyclopentadiene or norbornadiene, and conjugated aliphatic diolefins such as butadiene and isoprene.

The process of the invention is particularly satisfactorily applicable to the production of ethylene homopolymers and of copolymers containing at least 90 molar % and preferably 95 molar % of ethylene.

The polymerization may be carried out by any known process: in solution or suspension in a solvent or hydrocarbon diluent or else in the gaseous phase. For processes in solution or suspension use is made of solvents or diluents similar to those used for washing the catalytic complex; these are preferably aliphatic or cycloaliphatic hydrocarbons, such as butane, pentane, hexane, heptane, cyclohexane, methylcyclohexane, or mixtures thereof. The polymerization may also be carried out in the monomer or one of the monomers kept in the liquid state.

The polymerization pressure is generally between atmospheric pressure and 100 kg/cm$^2$, preferably 50 kg/cm$^2$.

The temperature is generally selected between 20 and 200° C, preferably between 60° and 120° C. The polymerization may be carried out continuously or discontinuously.

The organometallic compound and the catalytic complex may be added separately to the polymerization medium. They may also be brought into contact at a temperature between −40° and 80° C for a period which may range up to two hours before introducing them into the polymerization reactor. They may also be brought into contact in a plurality of stages, or else part of the organometallic compound may be added before the reactor, or else a plurality of different organometallic compounds may be added.

The total amount of organometallic compound used is not critical; it is generally between 0.02 and 50 m moles per dm$^3$ of solvent, diluent, or reactor volume, and preferably between 0.2 and 5 m moles/dm$^3$.

The amount of catalytic complex used is based on the transition metal content of the complex. It is generally so selected that the concentration will be between 0.001 and 2.5, and preferably between 0.01 and 0.25 milligram-atom of metal per dm$^3$ of solvent, diluent, or reactor volume.

The ratio of the amounts of organometallic compound and catalytic complex is likewise not critical. It is generally so selected that the organometallic compound/transition metal ratio expressed in mole/gram-atom, is higher than 1 and preferably higher than 10.

The mean molecular weight, and consequently the melt index, of the polymers produced by the process of the invention can be controlled by adding to the polymerization medium one or more agents modifying molecular weight, such as hydrogen, diethyl zinc or cadmium, alcohols, or carbonic anhydride.

The density of these homopolymers produced by the process of the invention can also be controlled by adding to the polymerization medium an alkoxide of a metal of groups IVB and VB of the Periodic Table. Thus, it is possible to produce polyethylenes with a density intermediate between that of polyethylenes produced by a high pressure process and that of conventional high density polyethylenes.

Among the alkoxides suitable for this adjustment, those of titanium and vanadium the radicals of which contain from 1 to 20 carbon atoms each are particularly effective. Among these, mention may be made of Ti(OCH$_3$)$_4$, Ti(OC$_2$H$_5$)$_4$, Ti[OCH$_2$CH(CH$_3$)$_2$]$_4$, Ti(OC$_8$H$_{17}$)$_4$, and Ti(OC$_{16}$H$_{33}$)$_4$.

The process of the invention makes it possible to produce polyolefins with remarkably high productivity. Thus, in the homopolymerization of ethylene, the productivity expressed in g of polyethylene per g of catalytic complex exceeds 2000 in certain cases. Because of these high productivities and also because the transition metal content of the catalytic complexes is relatively low, the polymers no longer need purification.

In the polymers produced by the process of the invention, the residual content of transition metals is particularly low. In general it is lower than 20 ppm. It is derivatives of these metals which are troublesome in the catalytic residues, principally because of the colored complexes which they form with the phenolic antioxidants usually used in the polyolefins. It is thus possible to eliminate the purification operation in the finishing of the polymer and achieve a very appreciable saving.

The polyolefins produced by the process of the invention are very suitable for the usual application of polyolefins injection, extrusion, blow extrusion, and the like.

The invention will be further described in connection with the examples that follow which are given for the purpose of further illustrating the invention and not as any limitation thereof.

EXAMPLE 1

10 g of mangnesium acetylacetonate (pentanedione-2,4-ate of Mg) of the formula Mg(C$_5$H$_7$O)$_2$ was suspended in 150 ml of TiCl$_4$ and the suspension brought to 130° C. The suspension was kept under agitation for 1 hour at this temperature, while the charge of TiCl$_4$ was renewed 6 times. This treatment made it possible to eliminate a viscous product which tends to initially form and to retain the solid product of the reaction of Mg(C$_5$H$_7$O)$_2$ with TiCl$_4$. This solid product was then washed with boiling hexane until all trace of TiCl$_4$ in the washing solvent disappeared. It was then dried in vacuo at 40° C until a constant weight was obtained. Elementary analysis of the catalytic complex obtained showed that it contained 109 g of magnesium, 104 g of titanium, and 550 g of chlorine per kg. The Cl/Ti atomic ratio was, therefore, 7 and the Cl/Mg atomic ratio about 3.2.

10.4 mg of this catalytic complex and 200 mg of triisobutylaluminium in the form of a 40 g/l solution in hexane were introduced into a 3-liter stainless steel autoclave containing 1 liter of hexane. The temperature of the autoclave was brought to about 85° C. Ethylene was introduced under a partial pressure of 10 kg/mc$^2$ and hydrogen under a partial pressure of 4 kg/cm$^2$.

The polymerization was continued for one hour while the pressure was kept constant by continuously adding ethylene. At the end of one hour, the autoclave was degassed and 95 g of polyethylene collected. The productivity per hour was, therefore, 9,100 g PE/g of catalytic complex. The specific activity of the catalytic complex based one gram of active metal and on 1 kg/cm$^2$ of ethylene was 9040 g PE/h. g Ti. kg/cm$^2$C$_2$H$_4$.

The polyethylene obtained had a melt index, measured according to the standard ASTM-D 1238-57 T, of 0.22 g/10 min.

EXAMPLE 2

2.5 g magnesium 9-hydroxyquinoleinate (C$_9$H$_6$NO)$_2$Mg, obtained by reacting 8-hydroxyquinoleine with MgCl$_2$, was suspended in 25 ml of pure TiCl$_4$ and the preparation of the catalytic complexes carried out as in Example 1.

Elementary analysis of the catalytic complex obtained showed that it contained 39 g of magnesium, 151 g of titanium, and 551 g of chlorine per kg. The Cl/Ti atomic ratio was therefore 5 and the Cl/Mg atomic ratio about 9.7.

A polymerization run was then carried out under the same conditions as in Example 1, except that 7.6 mg of catalytic complex were used. At the end of one hour 96 g of polyethylene were collected. The productivity per hour was, therefore, 12600 g PE/g catalytic complex and the specific activity was 8540 g PE/h. g Ti. kg/cm$^2$ C$_2$H$_4$.

The polyethylene obtained had a melt index of 0.03 g/10 min. (under a load of 5 kg.).

EXAMPLE 3

A series of reactions for the formation of catalytic complexes is carried out using the reactants and procedure of Example 1, except that for the magnesium acetylacetonate used therein there is substituted, separately and in turn, an equivalent amount of each of the bivalent metal compounds listed on page 4 hereof.

The resultant catalytic complex in each case is used to form a catalyst composition with triisobutylaluminum using the procedure and conditions set forth in Example 1 and each catalyst composition used to polymerize ethylene by the procedure and conditions set forth in Example 1.

It will be understood that it is intended to cover all changes and modifications of the examples of the invention herein chosen for the purpose of illustration which do not constitute departures from the spirit and scope of the invention.

What is claimed is:

1. A catalytic complex for use in the polymerization and copolymerization of olefins comprising the reaction product of a halogenated derivative selected from the group consisting of halides, oxyhalides, and alkoxyhalides of a transition metal of Groups IVB, VB, and VIB of the Periodic Table and a chelate organic oxygenated magnesium compound substantially free of hydroxyl groups fixed on the magnesium and having in their molecule at least one sequence of normal bonds of the magnesium - oxygen - carbon type and at least one coordination bond with the magnesium atom, in such a manner as to form a heterocycle in which the magnesium atom is included, said reaction product having a halogen/transition metal atomic ratio higher than its value in the starting halogenated derivative and a halogen/magnesium atomic ratio greater than 0.5.

2. The catalytic complex of claim 1, in which the magnesium atom is linked by means of oxygen and of the coordination bond to a C$_1$–C$_{20}$ carbon radical.

3. The catalytic complex according to claim 2, in which the magnesium compound is an enolate.

4. The catalytic complex according to claim 1, in which the magnesium compound is a complex obtained from phenolic derivatives having an electrodonor group in the ortho position in relation to the hydroxyl group.

5. The catalytic complex according to claim 2, in which the magnesium compound is magnesium acetylacetonate.

6. The catalytic complex according to claim 4, in which the magnesium compound is magnesium 8-hydroxyquinoleinate.

7. The catalytic complex of claim 1 in which the halogenated derivative of a transition metal is a chlorinated derivative of titanium.

8. A catalyt composition for the polymerization and copolymerization of oelfins comprising the catalytic complex of claim 1 and an organometallic compound of a metal selected from Groups IA, IIA, IIB, IIIA, and IVA of the Periodic Table.

9. The catalytic composition of claim 8 in which the magnesium compound of the catalytic complex is magnesium acetylacetonate.

10. The catalyst composition of claim 8 in which the magnesium compound of the catalytic complex is magnesium 8-hydroxyquinoleinate.

11. The catalytic composition of claim 8 in which the organometallic compound is an organo compound of aluminum.

12. The catalytic composition of claim 11 in which the halogenated derivatives of a transition metal is a chlorinated derivative of titanium.

13. A process for the manufacture of a catalytic complex of claim 1 which comprises reacting a halogenated derivative selected from the group consisting of halides, oxyhalides and alkoxyhalides of a transition metal of Groups IVB, VB and VIB of the Periodic Table and a chelate organic oxygenated magnesium compound substantially free of hydroxyl groups fixed on the magnesium and having in their molecule at least one sequence of normal bonds of the magnesium-oxygen-carbon type and at least one coordination bond with the magnesium atom, in such manner as to form a heterocycle in which the magnesium atom is included, at a temperature of from about 0° to 300° C. for a time sufficient for the catalytic complex to form, said reaction being carried out under conditions preventing the elimination from the reaction zone of gaseous by-products resulting from the reaction.

14. The process of claim 13, in which the catalytic complex is formed from a magnesium compound wherein the magnesium atom is linked by means of oxygen and of the coordination bond to a C$_1$–C$_{20}$ carbon radical.

15. The process according to claim 14, in which the magnesium metal compound is an enolate.

16. The process according to claim 13, in which the magnesium metal compound is a complex obtained from phenolic derivatives having an electrodonor group in the ortho position in relation to the hydroxyl group.

17. The process according to claim 15, in which the magnesium metal compound is magnesium acetylacetonate.

18. The process according to claim 16, in which the magnesium metal compound is magnesium 8-hydroxyquinoleinate.

19. The process according to claim 13 wherein the halogenated derivative of a transition metal is a chlorinated derivative of titanium.

20. A process for the polymerization and copolymerization of olefins which comprises conducting the polymerization or copolymerization in the presence of a catalyst composition comprising the catalytic complex of the reaction product of a halogenated derivative selected from the group consisting of halides, oxyhalides, and alkoxyhalides of a transition metal of the Group IVB, VB, and VIB of the Periodic Table and a chelate organic oxygenated magnesium compound which is substantially free of hydroxyl groups fixed on the magnesium and having in their molecule at least one sequence of normal bonds of the magnesium - oxygen - carbon type and at least one coordination bond with the magnesium atom, in such a manner as to form a heterocycle in which the magnesium atom is included, said reaction product having a halogen/transition metal atomic ratio higher than its value in the starting halogenated derivative and a halogen/magnesium atomic ratio greater than 0.5, and an organometallic compound of a metal selected from the Groups IA, IIA, IIB, IIA, and IVA of the Periodic Table.

21. The process according to claim 20, in which the magnesium compound contains a magnesium atom linked by means of oxygen and of the coordination bond to a $C_1$–$C_{20}$ carbon radical.

22. The process according to claim 20, in which the magnesium compound is an enolate.

23. The process according to claim 20, in which the magnesium compound is a complex obtained from phenolic derivatives having an electrodonor group in the ortho position in relation to the hydroxyl group.

24. The process according to claim 20, in which the magnesium compound is magnesium acetylacetonate.

25. The process according to claim 20, in which the magnesium compound is magnesium 8-hydroxyquinoleinate.

26. The process according to claim 20 wherein the halogenated derivative of a transition metal is a chlorinated derivative of titanium.

27. The process according to claim 20 in which the organometallic compound is an organo compound of aluminum.

28. The process according to claim 27 in which the halogenated derivative of a transition metal is a chlorinated derivative of titanium.

* * * * *

UNITED STATES PATENT AND TRADEMARK OFFICE
CERTIFICATE OF CORRECTION

PATENT NO. : 3,989,879
DATED : November 2, 1976
INVENTOR(S) : Eugene Berger et al.

It is certified that error appears in the above-identified patent and that said Letters Patent are hereby corrected as shown below:

Column 1, line 9, for "Ser. No. 118,988" substitute --Ser. No. 118,998--.
Column 4, line 28, for "1a" substitute --1A--;
line 65, for "cyclooctadienel,3" substitute --cyclooctadiene-1,3--.
Column 6, lines 51 and 52, for "10 kg/mc$^2$" substitute --10 kg/cm$^2$--;
line 60, after "based" insert --on--.

Signed and Sealed this

Nineteenth Day of April 1977

[SEAL]

Attest:

RUTH C. MASON
Attesting Officer

C. MARSHALL DANN
Commissioner of Patents and Trademarks